(12) United States Patent
McGowan et al.

(10) Patent No.: US 10,499,072 B2
(45) Date of Patent: Dec. 3, 2019

(54) MACRO CELL DISPLAY COMPRESSION MULTI-HEAD RASTER GPU

(71) Applicant: MIMAX, INC., Bothell, WA (US)

(72) Inventors: Scott James McGowan, Kirkland, WA (US); Mark Spencer Chamberlain, Issaquah, WA (US); Paul E. Jimenez, Seattle, WA (US); Kenneth S. Richter, Seattle, WA (US); Audie C. Berry, Jacksonville, FL (US)

(73) Assignee: MIMAX, INC., Bothell, WA (US)

( * ) Notice: Subject to any disclaimer, the term of this patent is extended or adjusted under 35 U.S.C. 154(b) by 0 days.

(21) Appl. No.: 15/688,589

(22) Filed: Aug. 28, 2017

(65) Prior Publication Data

US 2018/0167627 A1 Jun. 14, 2018

Related U.S. Application Data

(63) Continuation of application No. 15/436,735, filed on Feb. 17, 2017, now abandoned.

(60) Provisional application No. 62/296,567, filed on Feb. 17, 2016.

(51) Int. Cl.
| | |
|---|---|
| *H04N 19/176* | (2014.01) |
| *H04N 19/423* | (2014.01) |
| *H04N 19/156* | (2014.01) |
| *G06T 1/20* | (2006.01) |
| *H04N 19/503* | (2014.01) |
| *H04N 19/137* | (2014.01) |

(52) U.S. Cl.
CPC .......... *H04N 19/423* (2014.11); *G06T 1/20* (2013.01); *H04N 19/137* (2014.11); *H04N 19/156* (2014.11); *H04N 19/176* (2014.11); *H04N 19/503* (2014.11)

(58) Field of Classification Search
CPC ...... H04N 19/00; H04N 19/10; H04N 19/169; H04N 19/17; H04N 19/176; H04N 19/423; H04N 19/156; G06T 1/20
See application file for complete search history.

(56) References Cited

U.S. PATENT DOCUMENTS

| | | | |
|---|---|---|---|
| 6,262,695 B1 | 7/2001 | McGowan | |
| 7,477,256 B1* | 1/2009 | Johnson | .......... G06F 3/14 345/501 |
| 8,139,072 B2 | 3/2012 | McGowan | |
| 2003/0011609 A1* | 1/2003 | Deering | .......... G06F 3/14 345/582 |
| 2007/0171979 A1* | 7/2007 | Eerenberg | .......... H04N 19/44 375/240.24 |

(Continued)

*Primary Examiner* — Diane M Wills
(74) *Attorney, Agent, or Firm* — Seed Intellectual Property Law Group LLP

(57) ABSTRACT

A macro cell video compression system and related method, the system including a first raster device and a second raster device that is cross-linked to the first raster device to move macro cells between the linked first and second raster devices, each of the first and second raster devices comprising a video raster circuit having a raster phase locking circuit to perform frame locking and pixel locking between the first and second raster devices and to generate macro cells by one of the first and second raster devices, each of the first and second raster devices has two or more raster heads that generate the macro cells by pixel clock stalling.

11 Claims, 9 Drawing Sheets

(56) References Cited

U.S. PATENT DOCUMENTS

| | | | |
|---|---|---|---|
| 2007/0279411 A1* | 12/2007 | Bakalash | G06F 3/14 345/419 |
| 2011/0211642 A1* | 9/2011 | Cho | H04N 19/102 375/240.16 |
| 2017/0048534 A1* | 2/2017 | Croxford | H04N 19/40 |

* cited by examiner

MACRO CELL DISPLAY COMPRESSION MULTI-HEAD RASTER GPU

BACKGROUND

Technical Field

The present disclosure pertains to electronic circuits and related methods for generating images for electronic visual display and, more particularly, to a new architecture and related executable instructions that utilize macro cell concepts in a two head or more GPUs in addition to full frame compression.

Description of the Related Art

Video compression on desktop computers of high contrast imagery or natural imagery is costly both in terms of hardware circuits and electrical power. Video compression devices are often expensive, rely heavily on the use of large programmable chips, and they suffer bandwidth limitations due to the inherent nature of programmable Central Processing Unit (CPU) devices to generally not move pixels as effectively as purpose-built Graphics Processing Units (GPUs) of popular consumer priced display products, particularly when compared on both cost and performance bases.

Many small businesses need improved remote desktop connectivity at a lower cost. Moreover, costly hardware and software video compression systems often need updating that consumes excessive work-hours and fees. Video compression using software desktop compression generally exhibits poor frame rate performance, long latency, and is costly in terms of MIPs (millions of instructions per-second) and high power (watts) consumed by local computers and cloud-based server computers.

There are many applications that require low latency, high speed, and low power video compression, ranging from high-frame-rate aircraft black box camera recording devices to remote desktop screen sharing over networks.

High speed and low latency video compression devices are relatively expensive for business and tend to consume excessive electrical power. The excessive power consumption further affects the global human population in terms of pollution and competition for resources. Existing consumer electronics graphics cards use large scale integration (LSI) integrated circuits to support three-raster-head (GPUs). These cards are generally inexpensive and are already in production.

BRIEF SUMMARY

Unique methods proposed in the present disclosure leverage the inexpensive components found on consumer electronics graphics cards, enhancing the cards to implement high performance, low cost macro cell compression, and thus improving the state of the art.

In accordance with one aspect of the present disclosure, a macro cell video compression system is presented, the system including a first raster device and a second raster device that is cross-linked to the first raster device to move macro cells between the linked first and second raster devices, each of the first and second raster devices comprising a video raster circuit having a raster phase locking circuit to perform frame locking and pixel locking between the first and second raster devices and to generate macro cells by one of the first and second raster devices.

In accordance with a further aspect of the present disclosure, each of the first and second raster devices has two or more raster heads that generate the macro cells by pixel clock stalling.

In accordance with still yet another aspect of the present disclosure, each raster head has Start Address (SA) register values to affect two or more side-by-side columns or rows of sub-windows of the generated macro cells.

In accordance with yet another aspect of the present disclosure, each of the columnar sub-windows scans temporally in sync with at least one other columnar sub-window and in phase to generate an improved snapshot shutter effect and to have columnar sub window scans produce one of an index of checksums and an index of descriptive data of the macro cells, the descriptive data including data for color, brightness, contrast and cosine, to improve a compression function of the first and second rasters.

In accordance with another aspect of the present disclosure a macro cell video compression method is provided, the method including effecting frame locking and pixel locking between first and second raster devices to generate two or more side-by-side columnar sub-windows of a vertical stack of macro cells via whole raster heads where each whole raster head has its own Start Address (SA) register values, each of the columnar sub-windows scans temporally in sync with at least one other columnar sub-window and in phase to generate an improved snapshot shutter effect and to effectuate creation of macro cells via pixel clock stalling.

In accordance with a further aspect of the present disclosure, the method includes having the columnar sub window scans produce one of an index of checksums and an index of descriptive data of the macro cells, the descriptive including data for color, brightness, contrast and cosine, to improve a compression function of the first and second rasters. The video compression method of claim 11 comprising pixel locking and frame locking of a plurality of whole rasters that have two or more whole raster heads, and where each whole raster head has its own start address (SA) register values, to effect one or more side-by-side columnar sub-windows of a vertical stack of macro cells via the whole raster head scanning.

In accordance with a further aspect of the present disclosure, the method includes employing both methods of full frame scan and column macro cell scan to effect a full-frame difference detection engine simultaneously with a macro cell producing engine on a same changing of raster data needing to be compressed to obtain improved snapshot shutter effect and to avoid tearing effect artifacts when compressing changing images for improved compression and end-point viewing based on the changing raster data.

In accordance with still yet another aspect of the present disclosure, the method includes the first and second raster devices cooperating to form a differencing full frame detection engine simultaneously with a macro cell producing engine by alternating between full frame scan and column macro cell scan on the same changing data needing to be compressed, and in response to a temporal end of frame event on a previous frame that used one of the full frame scan or the column macro cell scan, setting up a next frame to produce compression of the data using the other of the full frame scan and the column macro cell scan on the same data, and then using the two streaming data types of full frame differences per pixel and the macro cell data to improve snapshot shutter effect and to avoid tearing effect artifacts when compressing images that are changing to thereby improve compression and improve end-point viewing of the changing data.

In accordance with another aspect of the present disclosure, the method includes using multiple display heads to display data from two or more whole raster heads of the same size as two or more like sized columns of pixels to form a larger raster image, and wherein the raster phase locking mechanism performs frame and pixel phase locking of the whole raster heads and includes scanning like sized areas of the video memory, and in response to a next pixel address generation using only one synchronous counter to step to a next pixel.

In accordance with yet a further aspect of the present disclosure, the method includes using a detection circuit attached to a mouse location register, and a hardware window location register coupled to the detection circuit to produce a pixel difference detection event and to concentrate scanning in particular areas interest of the full raster, allowing the pixel clock to be turned off for one or all of the raster heads, and turned back on again in response to detection of dynamic image action.

DETAILED DESCRIPTION

Figure 1:
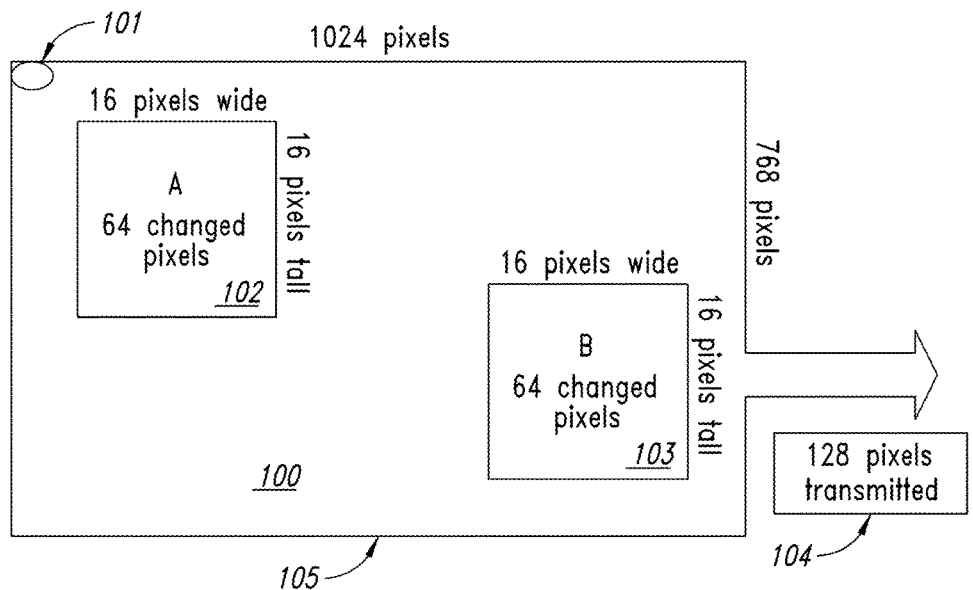
FIG. 1 is a block diagram illustrating a comparison of a simple full frame compression to a macro cell compression.
Figure 1:
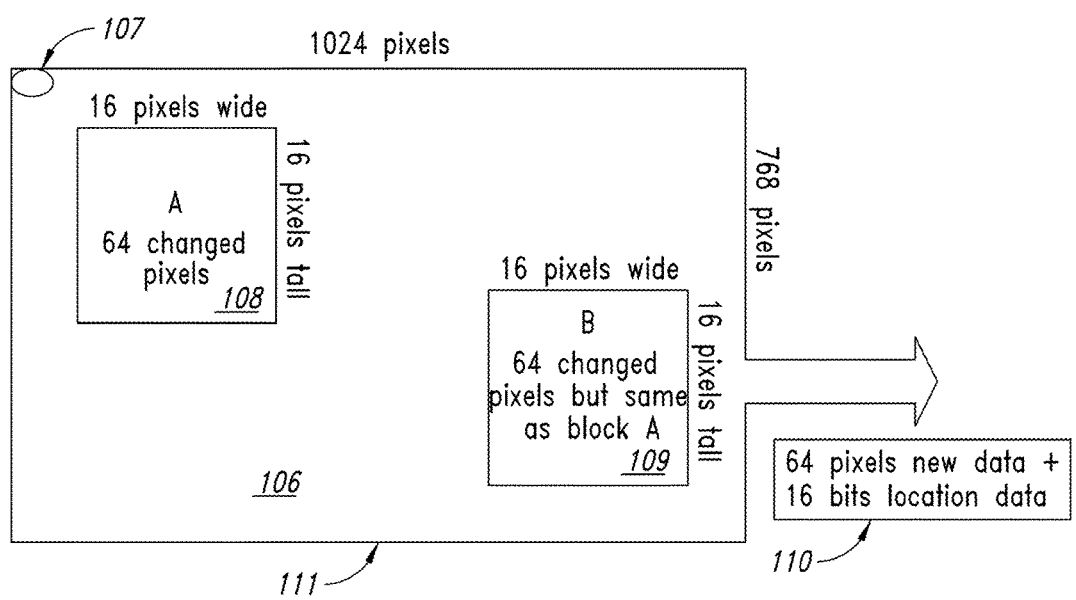

In the following description, some specific details are included to provide a thorough understanding of the various disclosed implementations. One skilled in the relevant art, however, will recognize that the disclosed implementations may be practiced without one or more of these specific details, or with other methods, components, materials, etc. In other instances, well-known structures associated with graphics processing, such as CPUs, GPUs, and control systems including microprocessors, memories, and drive circuitry have not been shown or described in detail to avoid unnecessarily obscuring descriptions of the implementations of the present systems and methods. Throughout this specification and the appended claims, the words "element" and "elements" are used to encompass, but are not limited to, all such structures, systems, and devices associated with GPUs, as well as their related programmable parameters.

Unless the context requires otherwise, throughout the specification and claims which follow, the word "comprise" and variations thereof, such as, "comprises" and "comprising" are to be construed in an open, inclusive sense, such as "including, but not limited to."

Reference throughout this specification to "one implementation" "an implementation", "another implementation", "one example", "an example", or "another example" means that a particular referent feature, structure, or characteristic described in connection with the implementation or example is included in at least one implementation or example. Thus, the appearances of the phrases "in one implementation", "in an implementation", "another implementation" or the like in various places throughout this specification are not necessarily all referring to the same implementation or example. Furthermore, the particular features, structures, or characteristics may be combined in any suitable manner in one or more implementations or examples.

It should be noted that, as used in this specification and the appended claims, the singular forms "a," "an," and "the" include plural referents unless the content clearly dictates otherwise. Thus, for example, reference to a graphics processing system including "a graphics processing unit" includes a single graphics processing unit or two or more graphics processing units. It should also be noted that the term "or" is generally employed in its generally accepted sense, including "and/or," unless the context clearly dictates otherwise.

The headings provided herein are for convenience only and do not interpret the scope or meaning of the implementations.

Graphics Processing and GPUs

Generally, computer systems utilize on-board graphics processors in the computer's motherboard to generate graphical images, such as still pictures and video images, on a display device. While this is suitable for most consumer needs, highly intensive graphic displays, such as those associated with a video game or 3D processing require higher computing power. To provide this additional processing capability, a stand-alone video card is connected to the motherboard and generates output images to the display device. Video cards are typically referred to as "graphics cards" and they include a processing unit, memory, a cooling mechanism, and connections for communication with the mother board and the display device.

The video card is most often built on a printed circuit board (as is the motherboard) and relieves the motherboard's CPU and memory of image processing. The processing unit on the video card is generally referred to as the Graphics Processing Unit (GPU). While there are similarities to the motherboard's CPU. The GUP design is optimized to work with images. The memory on a video card is very similar to the regular random-access memory (or RAM) on a motherboard. A video card connects to the motherboard of a computer system using a slot, typically an Accelerated Graphics Port (AGP) or a Peripheral Component Interconnect Express (PCIe) connection.

Because higher power video cards generate additional heat, a heat sink is included, such as metal strips, to distribute the heat evenly and dissipate the heat into the surrounding air. The heat sink is often located on top of the GPU, and a fan may also be included for additional cooling.

The process of generating a video image in most computing systems revolves around the creation, linking, and displaying of picture "frames." Each frame represents a compilation of pixels (or voxels, depending on the display system) that form the visual representation on the display screen. The individual image frames are generated by the GPU and displayed in a sequence at a predetermined rate, such as 60 frames per second (fps). A higher frame rate means more frames are displayed during that one second. To achieve higher frames per second, the frames must be refreshed at a higher rate. As a result the differences in the image pixels (or voxels) between each succeeding frame is very small, and the movement appears smoother to the viewer.

The transmission of video images can require large amounts of bandwidth and as a result can be slow, which can disrupt the appearance of the image, making image movement appear jerky or jittery or even freeze the image display temporarily. To avoid this latency in transmission, the video signals are "compressed" using a compression algorithm or technique. Various compression techniques have been developed over the years including, without limitation, lossless, lossy, intra-frame, and inter-frame, to name a few. The compressed video frames resulting from the compression operation (using intra-frame or inter-frame techniques and using lossy or lossless methods) are used in transmission instead of the regular (uncompressed) video frames to reduce the overall size of the video information to be transmitted.

Once the video frames are received and uncompressed, the frames are displayed. Video frame display techniques include raster scanning, which is a pattern of image capture, storage, transmission, and display. Raster scanning involves covering the display area in parallel lines that are scanned and displayed on a line-by-line basis. In other words, it systematically covers the display area one line at a time progressively. In conventional raster scanning operations, a beam sweeps horizontally from left to right down the display area, i.e., from top to bottom. Instead of a stair step pattern, the scan appears more like a saw-tooth pattern.

Raster scanning for video compression purposes is used to detect changes in the pixel characteristics from one frame to the next. Video acceleration and compression is enhanced by detecting and processing only those pixels that change from one frame to the next.

Some previous display compression acceleration devices (and those described in associated issued patents and published applications) have employed whole raster compression through careful use of feedback loops of multi-head GPUs (2 heads or more) output ports to input ports, combined with proper temporal timing of the loops and GPU raster outputs, such as discussed in U.S. Pat. No. 8,139,072. In such systems, the whole raster is tested for pixel changes, and typically at display refresh rates that also work on popular visible displays. Thus the GPU used for a computer user's direct real-time viewing can also be used to find the changed pixels from a previous frame to a current frame to effect video compression.

Simple whole raster compression that detects the pixel differences between the previous frame and the current frame tends to have the lowest latency for storing or network transport of data. The next lowest latency approach is to include or employ macro cell (groups of neighboring pixels) testing on the basis of real time streaming display data where no pseudo future frame or macro cell matching is attempted. "Future frame" is an effect whereby typically N frames of video (N is typically six or more) are not transported raw nor compressed, but rather delayed N frames, to allow for additional matching of macro cells within the N sequential frames. The present disclosure adds "macro cell" concepts, circuits, systems, and processes to the same 2-head or multiple head GPUs in addition to the full frame compression methods used in earlier systems or products.

GPU pixel scanning for changes in images is more reliable and deterministic than software compression solutions for producing macro cells. This is due to the inherent complexities of a computer's erratic main processor (CPU or motherboard) loading protocols and software drivers such as Open-GL or DirectX that draw directly to the video buffer, such that a compression application cannot process with a needed high frame rate performance and deterministic timing. GPUs also can move pixels with much greater data bandwidth and power efficiency than Field Programmable Gate Arrays (FPGAs), making GPUs excellent devices to be at the core of the compression process. GPUs have other features of hardware cursor and hardware windows and video memory writes that when improved in the hardware circuits or software video drivers can further reduce latency, and decrease power consumption.

Macro cells are whole image subset zones, typically rectangular, of visible, 2-dimensional graphical nature, such as an 8×8 or 16×16 pixel grid, as discussed below. The whole image is a collection of macro cells producing a larger raster image. The raster image can present itself as a whole screen to the user or as a rectangular region on the display such as embedded within a Windows graphical application. The smaller macro cells are smaller, but greater than 1 pixel. The smaller the macro cell, the more likely it can find a re-useable target area in an image being re-constructed. However the choice of macro cell size affects how many macro cells that must be managed in real-time. Larger macro cell pixel dimensions result in a smaller macro cell count. This number is usually about $\frac{1}{64}$th of the pixel count of a raster.

Considering a mix of circuit size, power consumption, and bus bandwidth tradeoffs, a popular industry size of a pixel group macro cell is 16×16 pixels to define which macro cells of an image changed, and which did not, to effect improved image compression where only macro cells whose content has changed are forwarded to a decompressing remote target. However this present disclosure tends toward larger macro cells in one preferred implementation, due to the use of 3-head GPUs for macro cell creation and comparison processing, via the GPU's three video raster heads which make up three columns of macro cells.

Due to the use of larger than typical macro cells, tracking of macro cell indices with unique checksums per-cell that are identical, are too few. This present disclosure also uses tracking indexes of macro cell cosmetic descriptors of dominant color, next dominant color, contrast of each dominant color zone and brightness and color intensity and contrast of each dominant color and cosine descriptor. Macro cell cosmetic descriptors would allow for an adjustable value of matching, or to be nearly matching or modestly matching.

This present disclosure may use the operating system software drivers or another hardware video head to further examine the large macros cells that have changed since last full frame, in order to optionally fragment the large macro cell into smaller macro blocks. This trade off allows for tracking a small index of macro cells and smaller-macro blocks. On a 3 head system of two display heads, and an input head, the other hardware video head would use the input head to load back into a different area of video memory the macro cells that changed. This implementation is done by sending each macro cell scanned back into video memory, but overwriting the fed-back macro cell, if by the end of the macro cell, the macro cell is found to be unchanged, since the last full frame. If the same macro cell is found to be changed, then the next macro cell is written to the next neighboring address block in video memory, thus preserving only the macro cells that had a changed pixel for further examination to the level of smaller macro blocks.

In one implementation of the present disclosure, the system and method optionally tracks run-length compressed line data descriptors of macro cells, using checksums and cosmetic descriptors to find image motion indications in a real-time manner.

The use of macro cells also allows the remote target display device to keep a current index of macro cells in its current image, and a list of recent, but unused macro cells currently in a buffer. Macro cells can be tracked by larger image location, arbitrary-check-sum, or color, brightness, contrast, and graphical orientation.

Macro cells that have the same data, whether from another part of the image or recently used at the remote target raster for full image re-assembly, can re-use those matching (duplicate data) macro cells without the need for re-transport of all macro cells.

To create macro cells more effectively, in terms of costs of circuits and power consumed, the present disclosure makes new uses of display lists (a term that was made popular for early graphical game-oriented computers such as Commodore and Atari for gaming effects triggered by current pixel location of a video stream), vertical blank interrupts (also used in the 1980's in gaming computers), and other custom hardware either in a customized GPU or next to a standard, popular GPU.

It is further noted that most modern GPU raster display systems inherited their full frame scanning concepts from early television, where the technology of those years required simple full frame scan, due to the needs of the simple electronics of the past. Each camera raster making a signal stream or display raster receiving a signal stream was costly. In modern times, as transistor sizes get extremely small, the number of display heads in GPUs is fast increasing. Modern applications include driving multiple visible displays, such as for helping a person to operate a vehicle, an entertainment system with multiple feeds, and modest video walls. New innovative uses of pixel-locked and frame locked multiple heads makes new and useful processes possible. Pixel and frame locking is a superset concept of Genlocking, where there are typically no pixel clock drift issues. Genlock creates a new pixel clock from one or all of a) incoming inherently clocked pixels, b) color signals or c) syncs. However Genlock pixel clocks are unstable for purposes of making special functions of multiple display heads using overlay, tiling, frame flip, or comparing pixels or zones of pixels for video compression.

Sending the display data to a display raster as macro cells will allow for improved video viewing and power savings, where the final display device will likely gain the ability to reconstruct macro cells into full displayed images. In particular with the nature of LED visible displays and Thin Film Transistors (TFT) visible displays, it is not necessary in many cases to re-scan the display data, if unchanged from the last average full frame, but rather a lower rate, to refresh unchanged areas of the final visual display.

The term "average full frame" is used because as frame rates rise, and as users demand higher quality viewing experiences, macro cell data transmission to the display becomes imperative, as the raw data volumes rise. Pixel counts of very high resolution visible displays and high frame rates have more cables, more electrical power, more unwanted EMI and more cost with attendant less reliability.

It is noted that the more cables, the more electrical power consumed, more unwanted EMI and less reliability, are all four independent sources of unwanted electronic pollution and cost. The present disclosure offers a simpler and more cost-effective solution that reduces electronic pollution.

In developing and developed countries, even as electrical lighting has become quite efficient, compared to 20 years ago, many nations need even more electrical power for computing systems. Visible displays are amongst the greatest consumers of electrical power in computing, communication, and entertainment, as well as handheld devices, and near the top power consumer in personal computers. Even computer servers for multiple users that use remote display suffer from high cost, high power, and high MIPS (million instructions per second) consumption, as these systems struggle to compress desktops. Aircraft video compression and storage for "black-box" recorders (recording data for forensic purposes) present another display compression issue. Some suppliers have added video recording to the black box product implementations/implementations. However, the final catastrophic event frames are missed in H264 popular compression implementations/implementations. H264 methods and formats are implemented in a plethora of available LSI (large scale integration) chips that reduce cost and power. However H264 is not well suited to low latency video event recording in crash testing or aircraft black boxes and ballistics tests.

High Latency in remote desktop systems erodes user satisfaction. Even if 60 frames per second compression is achieved (frame period=16.6 millisecond), if only six frames of delay due to compression occurs, then 100 ms of latency occurs. Typical remote computing connections, of client to server, that span the internet have another typical 50 ms or more latency to the server, and another 50 ms from the server, even when UDP type network packets are used. Frame rebuilding takes at least another frame time of 16.6 ms, and the user's system is thus exceeding 216.6 ms typical latency, from a user input to user visualization on his/her display. Government published human-computing-interface standards state that 100 ms should not be exceeded.

Raw video data streaming overloads networks and consumes storage at inordinately high rates, pushing flash memory to the edge of capability. Compressed video storage can be done, but only if there is very small time delay (latency), for decisions to be made of what display data is new (changed from previous frame). To further high speed compression for shrinking data size, macro cells are desirable; however, only if very little additional latency is the negative trade-off. The time-period for compression decisions on pixels or macro cells should never exceed more than 1.5 next full frame period time. H264 can often exceed 6 frames of RAM storage while making decisions on what data to store.

Thus, less processing and latency on full frames or macro cells allows for faster storage of real-time video in high speed fast-camera-image-change scenarios, such as two vehicles approaching each other, which a 400 frame per second camera may see for only one frame prior to a catastrophic event. And it is desired that data not be lost in high latency compression algorithms or devices. Modern GPUs with their inherent multiple heads can be uniquely modified to be ultra-fast macro cell analyzers for video compression.

Double buffering has been used on full frames of video data, to help prevent tearing effects in the full raster image, as a shutter-like function. In some implementations the image data changes are temporarily purposely halted, for the data set being compressed, as with double buffering that uses more memory; however this present disclosure uses less display memory, and with no need to copy the full frame to a buffer area, that consumes more power. Double buffering has more video memory bus reads and writes, rather this present disclosure uses multiple columns of macro cells being simultaneously produced from the same large raster image, to effect a shutter-snapshot feature.

The present disclosure offers improvements for latency, cost, and wattage against the core video compression task with new methods of use of GPU LSI-IC's for macro cells compression. Some areas of improvement include, without limitation:

1) Use of a GPU's multiple heads to effect macro cell creation and streaming of macro cells for creating the checksums and macro cell-cosmetic-descriptors.

2) Use of a GPU's multiple heads to effect macro cell creation and streaming of macro cells for creating the checksums and macro cell cosmetic descriptors, of either large macro cells, with the number of raster-columns of macro cells limited by the raster head count (of least 3 heads) in a GPU IC, and flipping the compression method rapidly and repetitiously (typically every other frame) of the GPU set up, from multiple columns to produce more narrow macro cells and associated indexes, and full-frame compression mode to produce the lossless difference data only of changed pixels.

3) Use of a GPU's multiple heads to effect macro cell creation and streaming of macro cells for creating the checksums and macro cell-cosmetic-descriptors, where this process has improved snapshot shutter effect by having the 3 heads in pixel and frame lock mode, where the frames are each a sub-width column of the full-frame raster.

4) Use of two or more GPU ICs that are pixel and frame locked, such that all the heads in this system process of compression are all pixel and frame locked, and where each GPU may be working on some columns of an image and the other GPU heads are simultaneously working on other columns of the full image, in a tiling like fashion, has an improved snapshot shutter effect regarding the whole raster.

5) Use of two or more GPU ICs, that are pixel and frame locked, such that all the heads in this system process of compression are all pixel and frame locked, and where one of GPU may be used as the macro cell producer and another GPU may be acting as a producer of the difference data only of changed pixels, and where the difference data is tracked by association with macro cell identifier indexes, and where the software video driver may assist this process by sending a same computer desktop image to both GPUs and their associated video memory buffers.

6) Use of GPUs having one raster head or more, to produce small macro cells, in narrow macro cell columns, by updating the Start Address (SA) register after each column completes its scan, and making use of either display lists to effect the SA register, or vertical blank with software driver assist, and where vertical blank method is used, to also stop the pixel clock, until the operating system and/or software driver can complete the SA-register update task.

7) Use of a GPU's hardware circuits of registers for cursor and windows-graphical-zones and memory writes that can trigger targeting of the changing pixel area, a small size macro cell column scanning to start, whereas pixel clock for that raster head may have been fully turned off (halted or gated off briefly) to save power and video memory bandwidth. The video driver may also be the method to sense for cursor, windows, and memory writes to trigger targeted small size macro cell column scanning to start.

Figure 8:
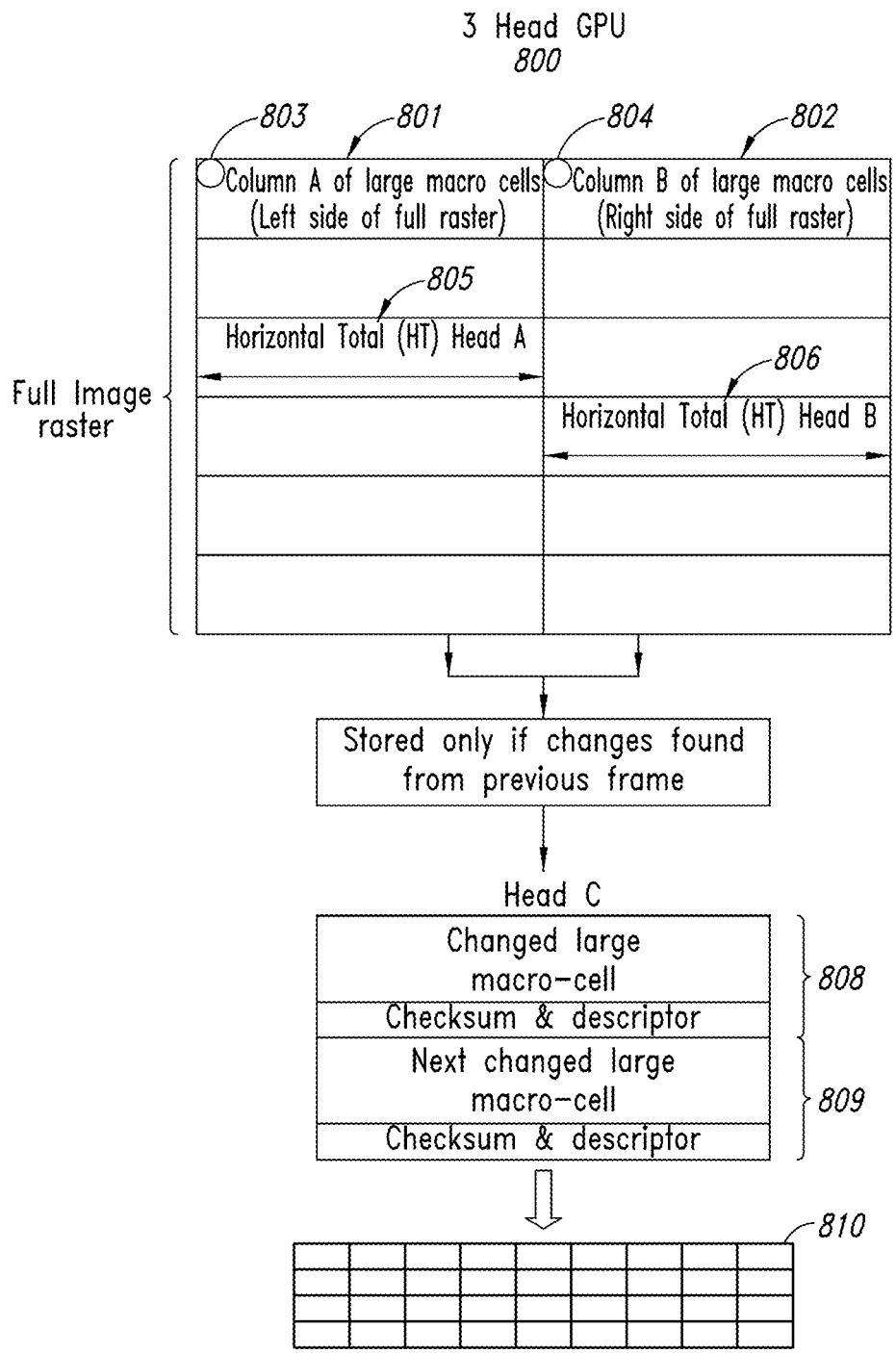
FIG. 8 is an illustration of a hardware configuration for a GPU having two heads for large macro columns and a third head as input for changed macro cells used for rescanning.

8) Use of two GPU raster-scan heads in a single, three raster-head GPU, for large size macro cells, and to save only those macro cells that changed for further examination by the third raster-scan head, on the data of the macro cells that are re-inputted to the video memory buffer, to be re-scanned again, for smaller-macroblock examination as in FIG. 8.

9) Adding to that method, the disclosure of U.S. Pat. No. 8,139,072, which is incorporated herein by reference in its entirety, a circuit that tracks pixel position in lines and the line count, on the real-time large raster data stream such that production of checksums occurs for small macroblock rectangular areas, by continuing, by re-visiting the work on any particular small macroblock, as next line scan count progresses as in FIG. 9.

10) Implementing raster scan feedback features of U.S. Pat. No. 8,139,072 method, to an existing GPU design on the IC-chip, as an added layer to effect the lowest cost production of a new compression chip variant of the GPU.

Turing next to the drawings, FIG. 1 illustrates a simple full frame compression of a Multi-raster GPU that produces the data index matches of two macro cells in different areas of the display [100]. A raster scan is shown beginning with Pixel 1 Start Address (SA) register) [101] value memory location, and shows the difference between 128 changed pixels, which are to be transported on a cable, in a larger image [104], that are geographically distant, such as 64 similar new pixels in the upper left [102], and 64 similar new pixels in the lower right of image [103], with new pixel data transmitted for the two new, but identical pixels groups. The new data transmitted is 128 pixels via a simple pixel difference detection method [105].

FIG. 1 also compares a macro cell method [111] of a multi-raster GPU set up to produce columns of macro cells, where the full-raster scan begins again in the upper left at SA-register value, which is the Pixel 1 Start Address SA memory location [107]. It also indicates the lower amount of necessary data transmission toward a remote display, if this process is via macro cells rather than pixels in a whole frame. In this implementation the two macro cell zones with new data, are identical or near identical. For this macro cell implementation, just one macro cell [110] with 64 pixels of new data is transmitted, with an extra 16 bits of data steering the one macro cell transmitted, to be copied to the destination image, two times, in two locations on the image.

Figure 2:
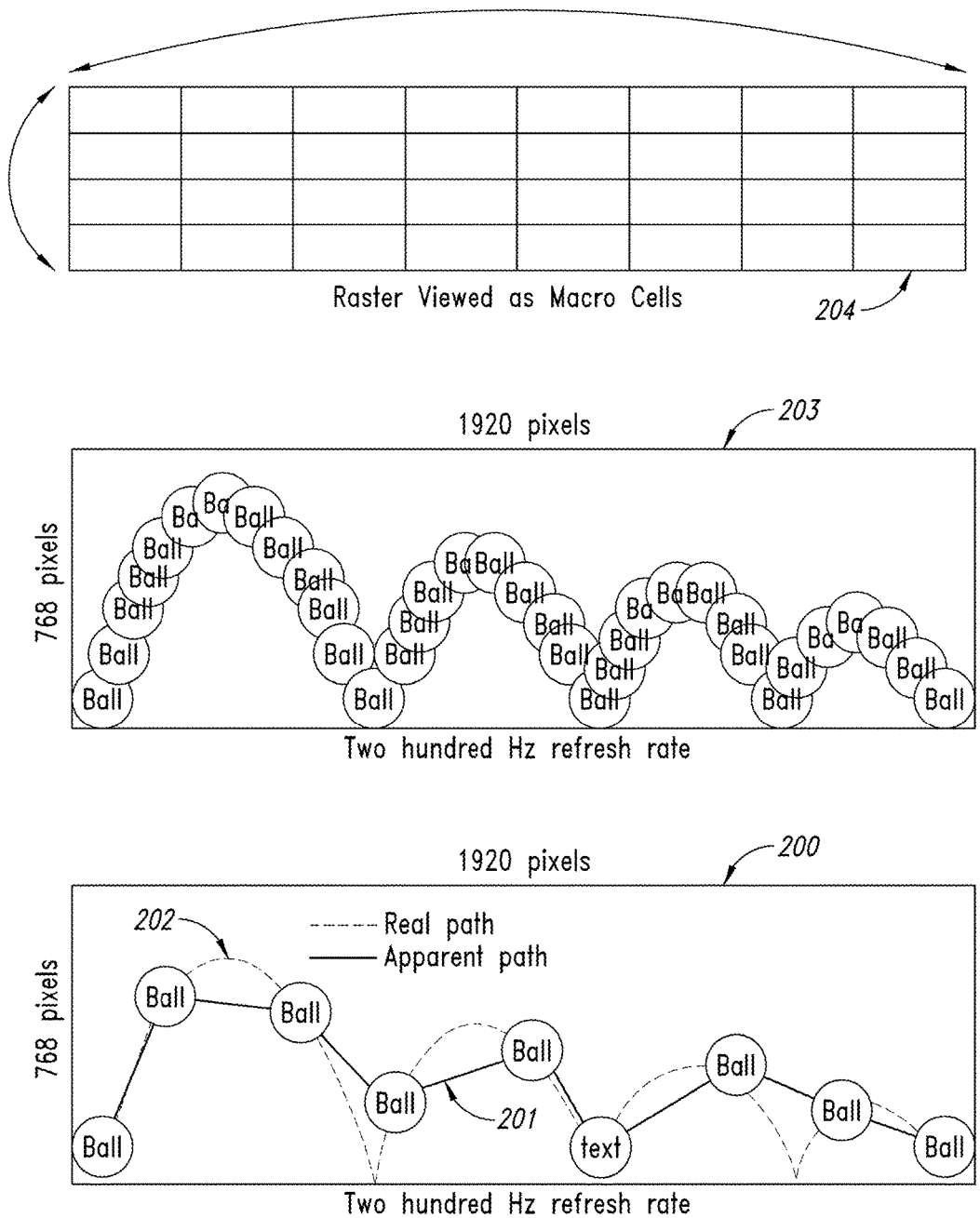
FIG. 2 is an illustration of a Raster viewed as Macro Cells and effects of full raster and frame rate effects on bouncing ball image data.

FIG. 2 shows a full progressive raster scan that includes macro cells compared to a raster divided into 32 macro cells, of 4 vertical by 8 horizontal [204]. GPUs are designed to have a primary feature of scanning a full image raster to an output port, thus for a display cable to transport same data to a display monitor, as repetitious periodic frame rate. To make a raster scanning designed GPU change to scan macro cells requires that the same GPU cannot feed a video stream to a standard simple raster visual display (progressive or interlace), but rather be scanning a dramatically more "narrow" (as a visual concept of the data) column. A typical full-frame raster can be, in comparison, considered to be a very wide column. Each scan type has its benefits depending on the changed-data, from frame to frame.

FIG. 2 also shows a new type of display [203], with a macro cell data decompressor (aka image re-assemble circuit) on board. This type of display can handle macro cells. This provides a more desirable viewing experience, with less video data transport, and at much higher average image-update frame rate. In business, engineering, or sports, the use of moving imagery, tracking small objects, etc., with greater update rate for those objects is much desired. For example, if a small object such as ball (represented as a two dimensional circle), bouncing across a raster 5 times [203], from left to right, in an arching trajectory behavior, in order for both physics and the human-brain-eye processes, there is the expectation to see the object graphically behave, and at least 200 frames per second of data is needed for smooth motion display over a one second period.

If, however, the ball is a mere 64 pixels in size, on a 1.47 million pixel count frame, this requires re-transmission of each frame to effect the ball movement. Just 100 frames represent 147 million pixels re-transmitted. Even with 147 million pixels re-transmitted, the displayed ball movement [201] in the lower panel [200] on FIG. 2 appears inaccurate from its real movement [202] shown in the middle panel of FIG. 2. If the frame rate is lowered to 2 FPS as shown in the lower panel [200], the ball can appear to move like an undesired artifact of a triangle wave pattern [201], which is not true to the actual historical path [202] the object took, as showing in the middle section of FIG. 2.

Figure 3:
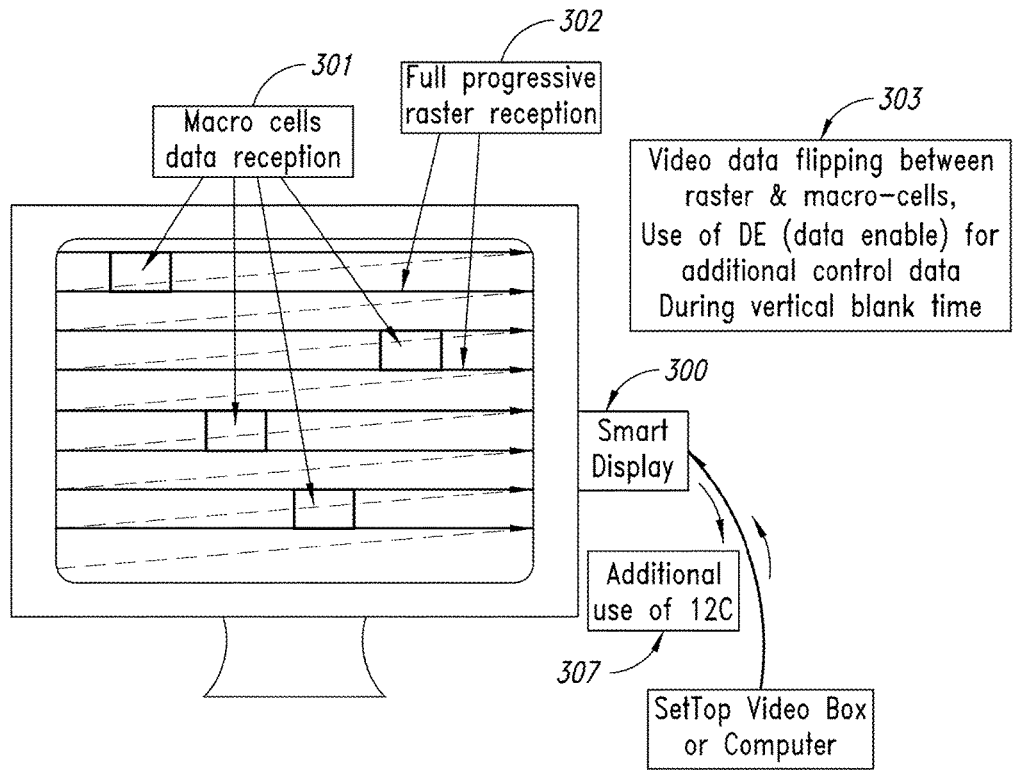
FIG. 3 is an illustration of display and data source flipping between a typical raster scan and the present implementation of macro cells using a single head GPU scanning.
Figure 3:
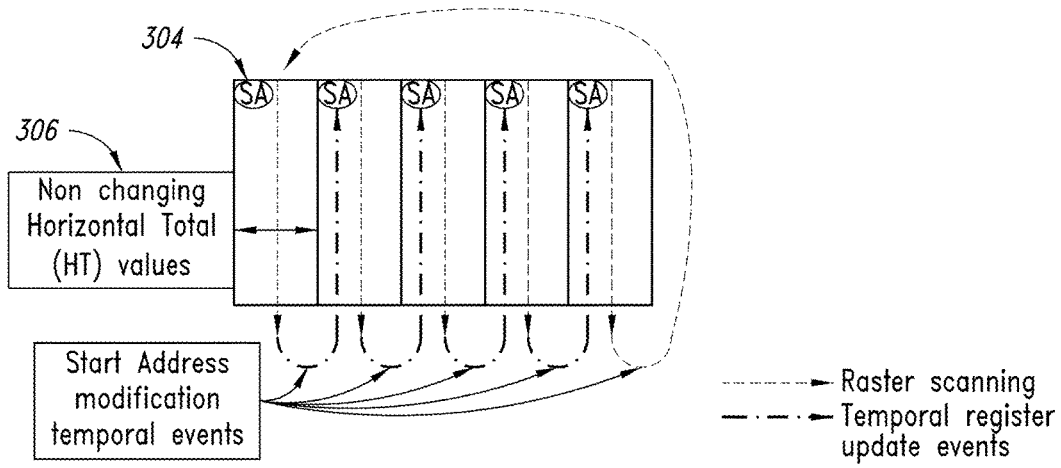

FIG. 3 shows a full frame on a display [300] that can receive both full-frame rasters and macro cell/macro-block data graphical rectangle data areas [301 and 302]. The upper drawing shows improved viewing full raster or macro-cells, flipping scan type as needed method. The drawing in the second section shows how the GPU IC can use a single head with manipulation of Start Address (SA) for multi-column macro-cell scan to scan narrow columns for a macro cell, or even smaller for a macro-block production. Popular video signal standards such as DVI and HDMI, have a DE (display enable) signal [303] that can be further used to allow for additional high speed data to come to a display without accidentally having that data appear on the screen, where that data informs a macro cell or smaller macro-block locations, or blocks to be duplicated, of existing data at the receiving end. Start Address (SA) [304] values are shown in the lower drawing, with SA modification of temporal events [305] also shown. And non-changing horizontal total (HT) values [306] are denoted on the left side of the lower drawing. An I2C signaling protocol [307] is further used beyond typical use of EDID (display identification and capabilities information) to send the signal back to the display card or set-top box feedback to assist in the macro cell or macro block processing.

Figure 4:
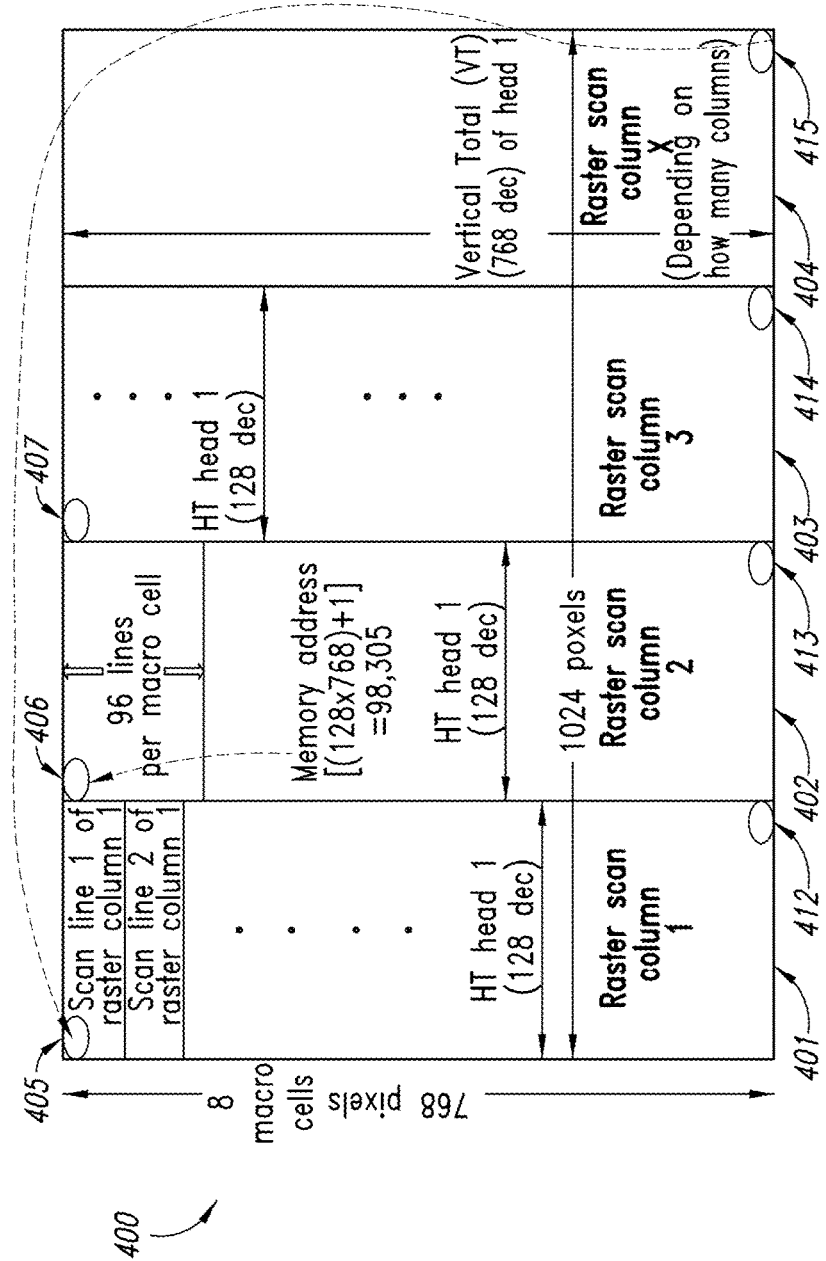
FIG. 4 is an illustration an XGA raster with a one-head GPU that updates Start Address for macro cell column scanning.

FIG. 4 shows a GPU with a 1024×768 full raster image [400] having three columns [402], [403], and [404], and an n column [404]. Each column has a Start-Address "SA" Register [411] that is common to GPUs to define the columns in a full-frame image, in a memory, with the same Horizontal Total (HT) value in each column. For a single raster head GPU, there is repetitious address generator, whose address output is fed to a memory address port, thus stepping the current pixel section to the next pixel section, and again to the next pixel section. It begins in the upper left [411] of a next column in an image, and scans horizontally line by line. It finishes up at the bottom right of the whole frame image. An output port is generally needed for each head, so that each head has an associated display port output for simultaneous, pixel clock locked and frame locked, data stream flows.

For a popular 1024×768 [400] full raster image, a horizontal line is 1024 pixels long, and 768 pixels tall, with the value 768 in the Vertical Total register [404]. For each head, there is one shared SA-register [411]. The shared single SA-register [411] holds the value of the video memory buffer address counter, for which the display output begins (which is the memory address) at each column.

More particularly, the SA-register [405] of column 1 [401] is pixel no. 1, line 1, of the full raster, and is also known as pixel no. 1, line 1, column 1 or SA (start address). Similarly, the SA [406] of column 2 is pixel no. 1, line 1, column 2, and the SA [407] of column 3 is pixel no. 1, line 1, column 3. Similarly, at the bottom of each column is an end address. The end address [412] of column 1 is pixel no. 128, line 768, the end address [413] of column no. 2 is pixel no. 128, line 768 of column 2, and the end address [414] of column no. 3 is pixel no. 128, line 768 of column 3. And the end address [415] of column n is pixel no. 128, line 768 of column n.

Generally when the bottom right of an image is pixel displayed, the last pixel of each column [405 and 408] also represents pixel positions in a full-frame raster [406 and 409]. Pixel positions in line 1 of full raster are the same as pixel positions of three line 1's of the macro-cell columns [401], [402], [403], and up to [404]. Typical X86 GPUs have the register titled "HT" Horizontal Total. In this case for the 1024×768 Horizontal Total value is 1024, and it is not updated in this column macro cell scanning method. Note the value can also often be 1023, with "0" being the left most pixel. For the sake of descriptive simplicity, the present disclosure starts the lines and rows at the natural number "1."

More particularly, in this present disclosure, the raster scanning process is set to a horizontal line width (HT-register) of 8, a typical value for (1024/8) 128 pixels wide. When the row count is (758/4) 192 pixels vertically tall, that defines the implementation macro cell. The raster scanning engine steps though a narrow version of the full raster, of what appears as a column, of the left most ⅛ of the full raster. This left hand column is also defined now as four macro cells. At the bottom right pixel of each column [401], [402], [403] the update of SA-register is triggered, to be updated to the new value, which is the starting point of the next column. The end of the last column, the first (left-most) column, becomes the next column, for a repeating periodic process.

In some cases the pixel clock can be stopped, halted, or paused when the bottom right pixels [412], [413], [414], [415] occur, thus allowing more time for various methods to reliably update the SA-register. For example, when the pixel clock is halted, the vertical blank VB or GPU display list of head 1 updates SA [406] to the value 98,305, which is pixel no. 129, line 1, of the full raster. And similarly, when the pixel clock is halted, the vertical blank VB or GPU display list updates SA [407] of head 1 to a value of 196,609, which is pixel no. 257, line 1, of a full raster.

The next issue is how to make the scanning process, of a typical raster implementation of 1024 pixel wide lines, now jump to pixel number 129 (of 1024 pixels), in the same top line, as to being its next column (of macro cells) of column 2 in the raster.

For column number 1 of the macro cells, a decimal value 1 (the upper left pixel [409] in the whole raster, and the upper left pixel of the first line) is programmed into SA-register, and a decimal value 129 (the right end of the line) is also programmed into the HT-register.

This top line of the next column (column 2) of macro cells is pixels 129 to 256, in reference to a full frame horizontal line of the next 128 horizontal pixels. Thus for column 2 of macro cells, a memory address decimal value [(128×768)+1]=98305 [407] (upper left pixel of this column 2) is programmed into SA-register for the next column, and coincidentally a decimal value 256 (the right end of the line) is also programmed into the HT-register.

Likewise the next SA register update is at the top line of column 3, which is macro cell pixels 257 to pixel 384, in reference to a full frame horizontal line of the next 128 horizontal pixels. Thus for column 3 of macro cells, a memory address decimal value [(256×768)+1]=196609 [410], (upper left pixel [407] of this column 3) is programmed into the SA register for the next column, and coincidentally a decimal value 384 (the right end of the line) is also programmed into the HT-register.

In this manner for another implementation of the eight columns (eight heads in a GPU), all 8 virtual columns, acting as columns of macro cells, get scanned, and pumped out of the GPU's output port of one of the GPU's heads. In this implementation, the eight heads have eight Start Addresses (SA) and eight Horizontal Totals (HT). In this implementation, the purpose built compression LSI-IC's (or customized GPU), there would be only one HT register, even if there were eight rasters, as each raster typically needs the same Horizontal Total (HT) value in a macro cell compression concept.

However, it is noted that typical GPUs are primarily purpose built for human viewing of whole rasters, and this present disclosure is to re-purpose as-built GPUs into effective, low cost per unit, low power, low latency, and low development cost macro cell and smaller macro-block engines, and in some cases, where the GPU still serves the function for human raster viewing simultaneously, on as-built display systems.

As in FIG. 3, the Start Address (SA) [304] of a raster head is continually adjusted, along with a narrower than full frame width (such as 1024 for a typical 1024×768 frame, aka XGA) decimal value for Horizontal Total (HT), such as HT=1024/64=16.

The SA register is changed (updated) in a round robin fashion to scan though all columns of the full frame, and start again at the first column in a repeating, periodic fashion.

And as in FIG. 4, changing the SA register in the GPU, may not be possible in all 3-head GPUs because of circuits and features built into the GPU. In that implementation, the host operating system or external circuits may assist by stalling a pixel clock at the end of each column long enough to write the new value to Start Address (SA) and then release (ungate) the pixel clock to run.

A vertical Blank interrupt typically is not a visually 100% stable method for a game graphics update method when a pixel data or graphics chip register update task is carried out by a multi-tasking operating system (OS). However this works well when the pixel clock is halted, stalled, or paused on the particular head of the GPU whose data needs the update. No matter of how long the multi-tasking operating system (OS) takes to complete the register update task, the macro cell column raster scanning is put on a wait status. A more hardware orientated register update in the GPU is preferable, such as "display list" whereas pixel positions in the current scan trigger a task, all inside the same GPU chip (IC).

Typically, when the columns are made as narrow as the macro cell width is desired (smaller macro cells provide much higher rates of matching macro cells to be found in the data compression process), all three heads would likely be employed to that end. In this case the SA-register is round-robin updating, and with HT-register set to a typically low value such as 16 (decimal) or 32 (decimal), even though HT-register is designed in GPUs for values like 1900 (decimal).

When the compression needs to both identify the macro cells and compress the data in the macro cells, if but one 3-head GPU is used, then the macro cell column scanning is walked though on a slower rate, as the other two heads are employed in pixel value difference detection (from a previous frame) of the same streaming data as described in U.S. Pat. No. 8,139,072.

Figure 5:
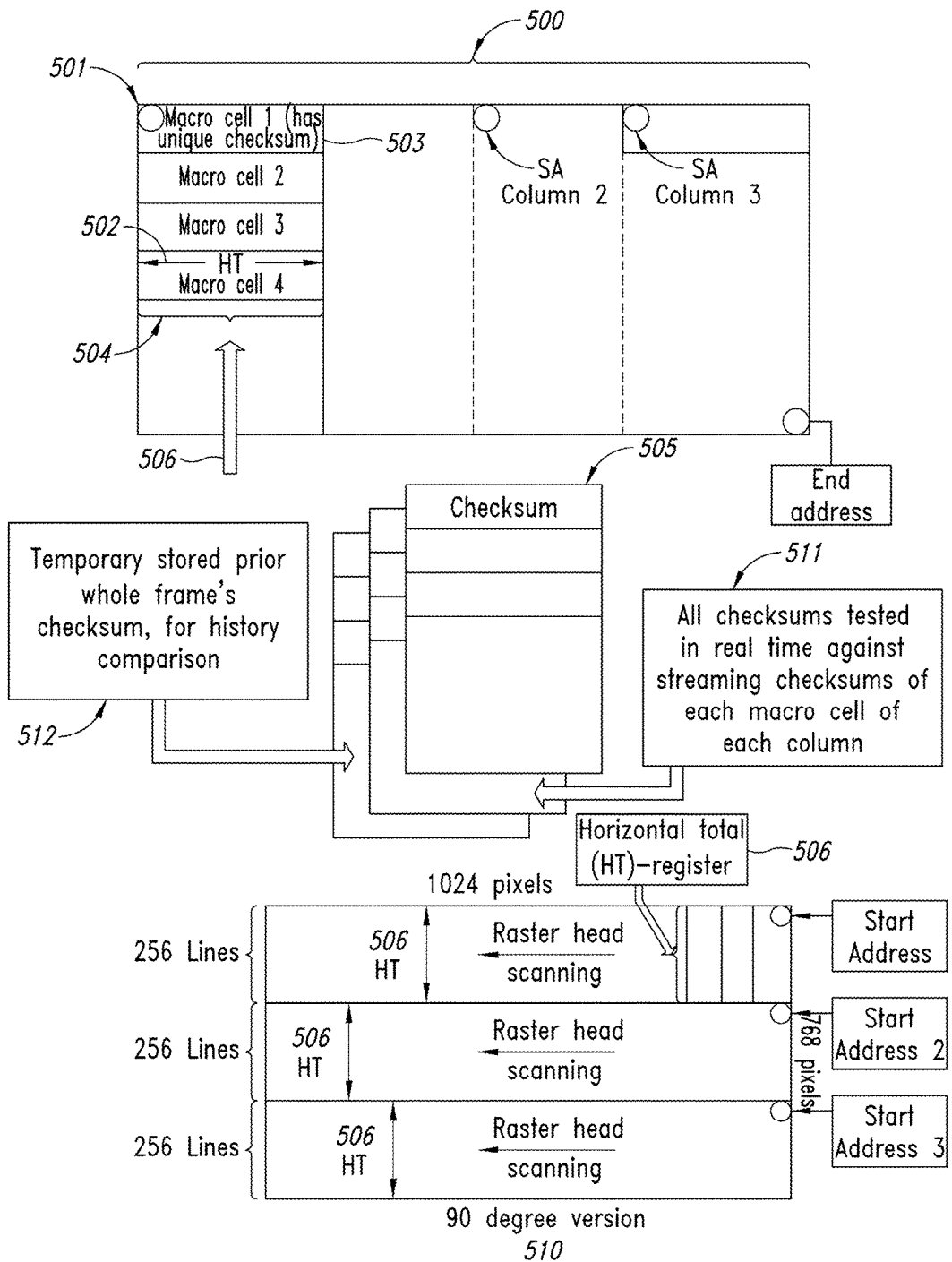
FIG. 5 is an illustration of macro cell column scanning with and without a 90 degree shift.

FIG. 5 shows how checksums [503] and cosmetic descriptors of the cells are continually stored [505] in real time in a full raster [500], from macro cell scanning that begins at Start Address (SA) register value location in memory [501], with a line width [504] of the macro cells, and the same for the column [502]. All macro cells have a (1) unique checksum except for those that are identical, or (2) semi-unique cosmetic descriptor. Even more narrow columns (smaller Horizontal Total (HT) values) [506] may be scanned at 90 degrees [510] with associated Start Addresses of [507, 508 and 509], which desirably produces smaller-macro cells or smaller-macroblocks as the raster being scanned is often a rectangle set up for human viewing with greater width then height. All checksums are tested in real time against streaming checksums of each macro cell of each column [511]. In addition, there is temporary storing of the prior whole frame's checksum [512] for history comparison.

Figure 6:
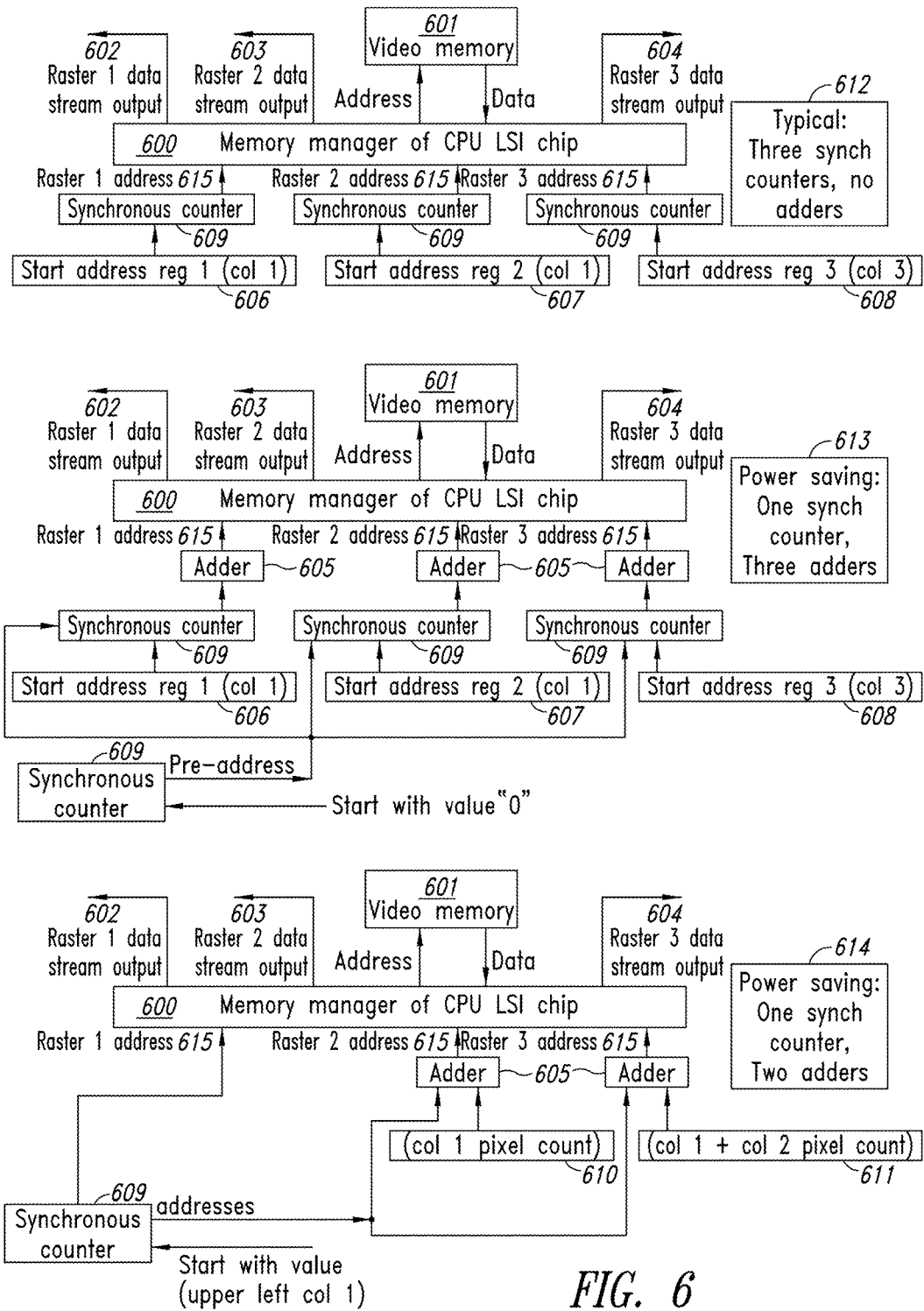
FIG. 6 is an illustration of raster address generation for power saving and chip area saving.

Another area of multi-head GPU design and use in accordance with another implementation of the present disclosure that is important to compression is to use new variations on the memory address generation process, for the multiple heads as shown in FIG. 6. FIG. 6's three implementations demonstrate that synchronous counters typically use much more wattage than adders. If the scanning pixel-count range (such as similar columns in a raster) in video memory [601] is the same for the multiple heads, using a common video memory, accessed by a common memory manager [600], then the high power consuming synchronous counter [609] can be shared by use by another adder step [605]. The three raster-address function [615] flowing into the memory-manager [600] produces three output raster data streams from video memory [602, 603 and 604].

The variant "Typical: Three sync counters, no adders" [612] is the common method of three head GPUs with three active rasters (either input or output rasters), achieves the three raster-address function [615] with typical power consumed.

The variant "Power saving: One sync counters, three adders" [613] makes use of only one synchronous counter, and three adders to achieve the three-raster-address-function, achieves the three raster-address function [615] with lower power consumed.

The variant "Power saving: One sync counters, two adders" [614] makes use of only one synchronous counter, and two adders to achieve the three-raster-address-function [615], with lowest power consumed.

Figure 7:
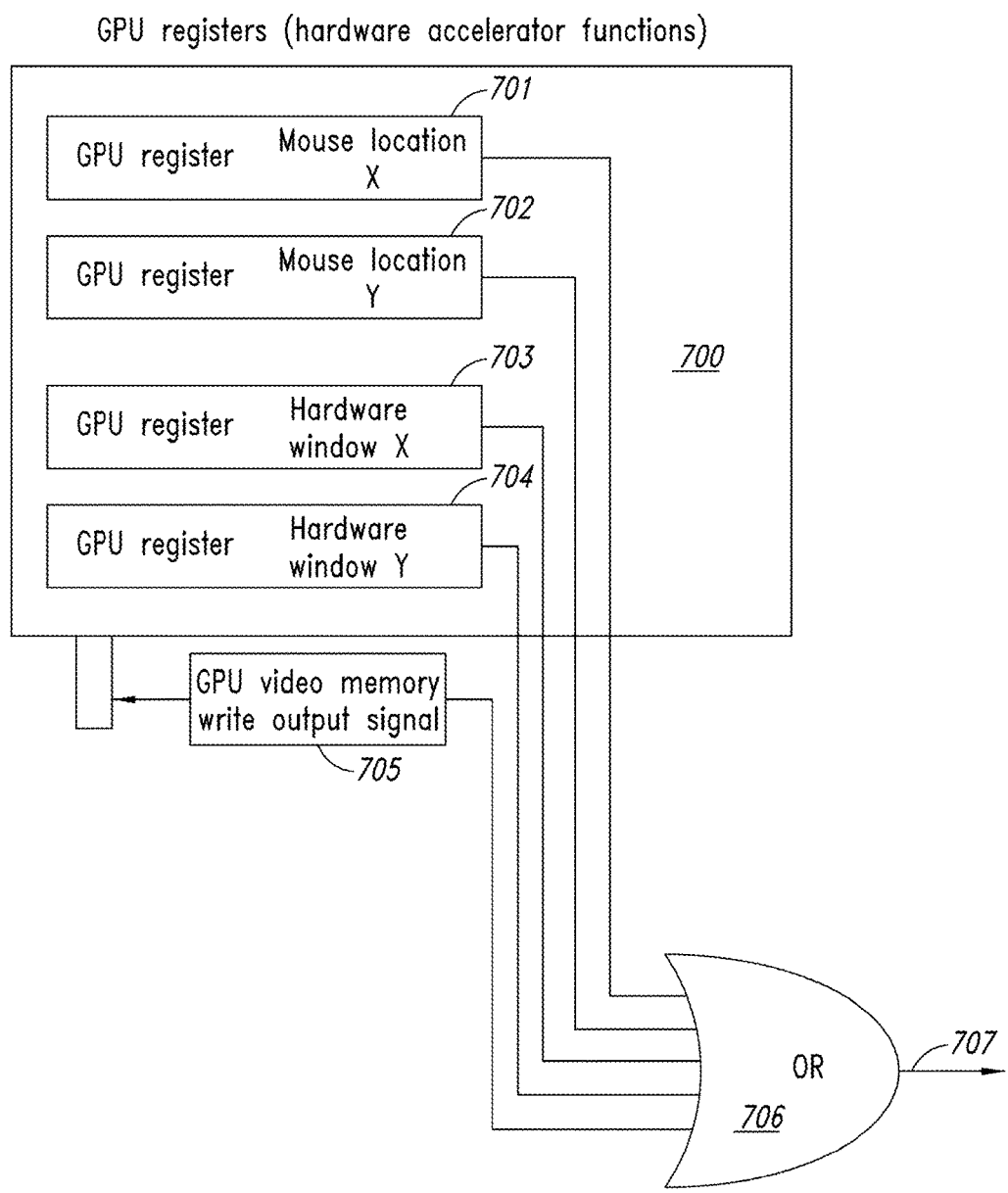
FIG. 7 is an illustration of a GPU hardware design with registers having activity updates from a software video driver used for compression scan wakeup.

A multi-head GPU design and implementation for compression can also be further improved by new methods that use existing hardware acceleration [700] components in the GPU, such as the mouse [701 and 702] and hardware windows [703 and 704] or a memory-write control pin [705] as in FIG. 7, because any of which can be hardware ORed [706] to trigger compression scanning [707] by scan circuits that had been held in a low power state. In other words, the output [707] of the OR gate 706 represents the start pixel clock (wakeup) of the macro cell raster scan and it concentrates on an active display area that has changing pixels.

An additional new variant of the 3 head GPU [800] implementation for raster compression is shown in FIG. 8, is to dedicate two heads as two wide columns A and B [801 and 802], each with their own different Start Addresses [803 and 804], but typically with the same Horizontal Total (HT) values [805 and 806], scanning from top to bottom, or at 90 degrees (for more narrow columns, of typical display systems), where the third head C [810] is dedicated to re-examine the large macro cells, and in which a pixel change was detected [807] and stored [808 and 809] for more desirable smaller-macroblocks that will provide more matches of graphical zones to data that has been already stored or transported to a remote viewing location. The detected pixel change only if changes are found from the previous frame.

Also, in an additional implementation feature, when changed macro cells are detected and stored [807, 808 and 809], the raster pixel clocks of head A [801] and head B [802] can be stopped, halted, or paused while the head C [810] performs a smaller-macro cell re-scan of the particular macro cell to effectively produce the smaller macroblock data. This uses less circuits and checksum indexes, which better serves compression and effective finding more cell matches to data already transmitted or stored.

Figure 9:
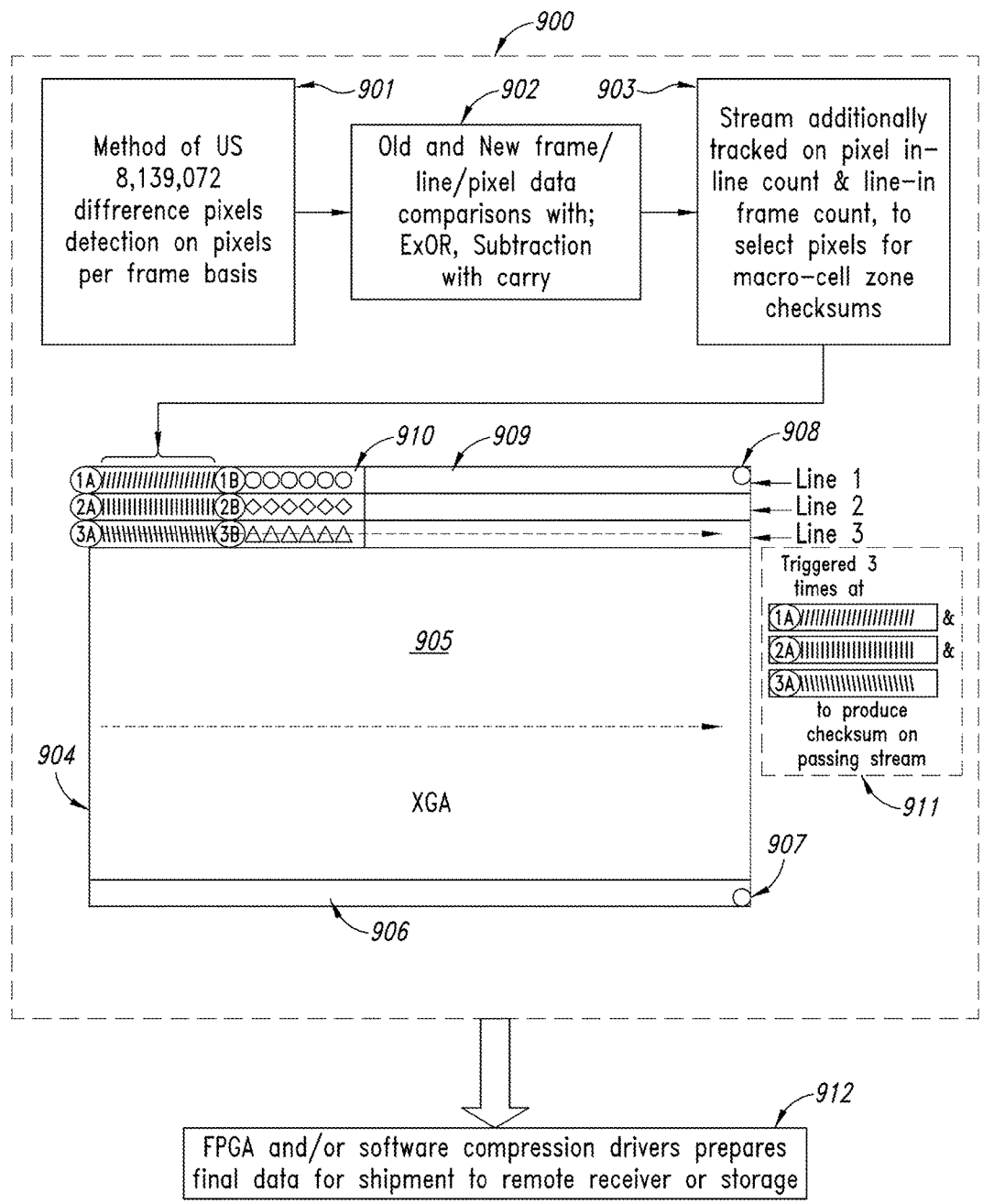
FIG. 9 is an illustration of a hardware configuration for a three-head GPU for full frame raster scan and pixel difference detector using external circuits to produce checksums on smaller macro blocks.

FIG. 9 shows how the method of GPU full frame video compression patent [900] can be improved and implemented in GPU hardware by building checksums of smaller-macroblocks while in a typical full frame raster scan by tracking pixel counts in lines, and line counts in frames while in full line scans. In addition to the method described in U.S. Pat. No. 8,139,072, [901] in which the GPU is set up to stream old and new frames to Exclusive-Or pixel data comparison [902], a method of the present disclosure is used to Subtract-with-carry (in parallel with the Ex-Or). Additionally, discrete-cosine, cosmetic-descriptor, and check-sum are run on the macro cell zones in conjunction with the streaming of the new frame data [903]. Thus, several different compression methods are running simultaneously, from finding the raw new or different pixels, to also the difference pixel value in reference to the old pixel. On the illustrated XGA [904], which has long 1024 pixel, regular scan lines [905] shown in dashed lines, the lines are produced by typical single head raster scanning and with smaller macro blocks. The bottom line [906] is line 768 of the full raster and the last pixel [907] is pixel number 1024 of the final line [906]. Similarly, in the upper right corner is the last pixel 1024 [908] of line 1 [909]. Smaller macro blocks [910] are also illustrated. The points 1A, 2A, 3A, 1B, 2B, and 3B in the full line scans [902] represent trigger points for checksum calculation coherently to which macro block. A macro cell A [911] is shown, triggered three times at 1A, 1B, 1C, to produce a checksum on the passing data stream.

An FPGA [912] is shown next to the GPU [900] or the software video compression driver (residing with the operating system on the computer with this compression process), can then further process the real-time, raw difference pixel data, or the real-time macro cells, and macro cell attribute index data, in a mix that provides compression with both low latency and to lower the data volumes shipped to the receiving system or storage, while still based on the GPU-ICs being the best device to transport pixels inside this core process, for the attributes of cost of product and low power consumption.

The various implementations described above can be combined to provide further implementations. Aspects of these implementations can be modified, if necessary to employ concepts of the various patents, applications and publications disclosed herein and known to those skilled in the art to provide yet further implementations.

These and other changes can be made to the disclosed implementations in light of the above detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the present disclosure.

The invention claimed is:

1. A macro cell video compression system, comprising:
a first raster device and a second raster device that is cross-linked to the first raster device to move macro cells between the linked first and second raster devices,
each of the first and second raster devices comprising a video raster circuit having a raster phase locking circuit to perform frame locking between the first and second raster devices and to generate macro cells by one of the first and second raster devices;
wherein each of the first and second raster devices has two or more raster heads that generate the macro cells by pixel clock stalling;
a detection circuit attached to a mouse location register, and
a hardware window location register coupled to the detection circuit to produce a pixel difference detection event and to concentrate scanning in selected areas of the full raster, allowing the pixel clock to be turned off for one or all of the raster heads, and turned back on again in response to detection of dynamic image action.

2. The video compression system of claim 1 wherein each raster head has Start Address (SA) register values to effect two or more side-by-side columns or rows of sub-windows of the generated macro cells.

3. The video compression circuit of claim 2 wherein each of the columnar sub-windows scans temporally in sync with at least one other columnar sub-window and in phase to generate an improved snapshot shutter effect and to have columnar sub window scans produce one of an index of checksums and an index of descriptive data of the macro cells, the descriptive data including data for color, brightness, contrast and cosine, to improve a compression function of the first and second rasters.

4. The video compression circuit of claim 2 wherein the system includes a start address register, and each raster head in the GPU uses a vertical blank interrupt to trigger the Start Address (SA) register to be updated to the next column or row start, and to effect a whole raster scan column by column or row by row, and then restart at the beginning of the raster scan.

5. The video compression system of claim 1 wherein the first and second raster devices cooperate as a full-frame difference detection engine and macro cell producing engine by utilizing frame locking for full frame scan and column macro cell scan on the data needing to be compressed to improve snapshot shutter effect and to avoid tearing effect artifacts when compressing images that are changing to thereby improve compression and improve end-point viewing of the changing data.

6. The video compression system of claim 1 wherein the first and second raster devices can be further configured and repurposed for a raster generating address mode to further save electrical power, whereby multiple display heads are used to display two or more whole raster heads of the same size as two or more like sized columns of pixels to form a larger raster image, and wherein the raster phase locking mechanism performs frame and pixel phase locking of the whole raster heads and includes scanning like sized areas of the video memory, and in response to a next pixel address generation using only one synchronous counter to step to a next pixel.

7. A macro cell video compression method, comprising:
effecting frame locking between first and second raster devices to generate two or more side-by-side columnar sub-windows of a vertical stack of macro cells via whole raster heads where each whole raster head has its own Start Address (SA) register value, each of the columnar sub-windows scans temporally in sync with at least one other columnar sub-window and in phase to generate an improved snapshot shutter effect,
wherein each of the first and second raster devices has two or more raster heads that generate the macro cells by pixel clock stalling; and
using a detection circuit attached to a mouse location register, and
a hardware window location register coupled to the detection circuit to produce a pixel difference detection event and to concentrate scanning in particular areas interest of the full raster, allowing the pixel clock to be turned off for one or all of the raster heads, and turned back on again in response to detection of dynamic image action.

8. The video compression method of claim 7, further comprising having the columnar sub window scans produce one of an index of checksums and an index of descriptive data of the macro cells, the descriptive including data for color, brightness, contrast and cosine, to improve a compression function of the first and second rasters.

9. The video compression method of claim 7 comprising frame locking of a plurality of whole rasters that have two or more whole raster heads, and where each whole raster head has its own start address (SA) register values, to effect one or more side-by-side columnar sub-windows of a vertical stack of macro cells via the whole raster head scanning.

10. The method of claim 7 further comprising employing both methods of full frame scan and column macro cell scan to effect a full-frame difference detection engine simultaneously with a macro cell producing engine on a same changing of raster data needing to be compressed to obtain improved snapshot shutter effect and to avoid tearing effect artifacts when compressing changing images for improved compression and end-point viewing based on the changing raster data.

11. The video compression method of claim 7 comprising using multiple display heads to display data from two or more whole raster heads of the same size as two or more like sized columns of pixels to form a larger raster image, and wherein the raster phase locking mechanism performs frame and pixel phase locking of the whole raster heads and includes scanning like sized areas of the video memory, and in response to a next pixel address generation using only one synchronous counter to step to a next pixel.

* * * * *